United States Patent [19]

Blegen

[11] Patent Number: 4,517,222

[45] Date of Patent: May 14, 1985

[54] VAPOROUS AMINE CATALYST SPRAY METHOD OF APPLYING A FILM TO A SUBSTRATE

[75] Inventor: James R. Blegen, Worthington, Ohio

[73] Assignee: Ashland Oil, Inc., Ashland, Ky.

[21] Appl. No.: 615,135

[22] Filed: May 30, 1984

Related U.S. Application Data

[63] Continuation-in-part of Ser. No. 474,156, Mar. 10, 1983, abandoned.

[51] Int. Cl.³ .......................... B05D 1/04; B05D 1/06
[52] U.S. Cl. .................................. 427/30; 427/385.5; 427/426
[58] Field of Search ................. 427/255.3, 255.6, 421, 427/426, 372.2, 27, 30, 31, 385.5

[56] References Cited

U.S. PATENT DOCUMENTS

| | | | |
|---|---|---|---|
| 2,823,143 | 2/1958 | Upperman | 427/426 |
| 2,955,058 | 10/1960 | Foster | 427/426 |
| 3,049,439 | 8/1962 | Coffman | 427/426 |
| 3,119,716 | 1/1964 | Wooster | 427/421 |
| 3,179,341 | 4/1965 | Plos et al. | 427/421 |
| 3,249,304 | 5/1966 | Faro et al. | 427/421 |
| 3,409,579 | 11/1968 | Robins | 427/255.6 |
| 3,429,848 | 2/1969 | Robins | 427/255.6 |
| 3,440,086 | 4/1969 | Kerns | 427/426 |
| 3,535,151 | 10/1970 | Raffel et al. | 427/421 |
| 3,676,197 | 7/1972 | Harrison et al. | 427/426 |
| 3,822,226 | 7/1974 | Taft et al. | 427/255.6 |
| 3,893,621 | 7/1975 | Johnson | 427/421 |
| 4,177,342 | 12/1979 | Bock et al. | 427/30 |
| 4,195,148 | 3/1980 | Hagen | 427/421 |
| 4,234,445 | 11/1980 | Hagen | 427/421 |
| 4,235,766 | 11/1980 | Kuijper | 427/421 |
| 4,322,460 | 3/1982 | Howe et al. | 427/421 |
| 4,343,924 | 8/1982 | Linden | 427/255.6 |

FOREIGN PATENT DOCUMENTS 23010 12/1983 Australia ............................... 427/27

*Primary Examiner*—Sadie L. Childs
*Attorney, Agent, or Firm*—Mueller and Smith

[57] ABSTRACT

Disclosed is a novel method for applying a film of a coating composition in liquid form onto a substrate which applied film cures rapidly at room temperature without heat curing. The coating composition comprises a hydroxyl-functional compound (preferably bearing aromatic-hydroxyl groups) and a multi-isocyanate cross-linking agent, optionally dispersed in a fugitive organic solvent therefor. The method comprises the steps of:

(a) concurrently generating an atomizate of said coating composition and a carrier gas bearing a catalytic amount of a vaporous tertiary amine;

(b) mixing said atomizate and said vaporous catalytic amine-bearing carrier gas flow; and (c) directing said mixture of step (b) onto said substrate to form said applied film.

35 Claims, No Drawings

VAPOROUS AMINE CATALYST SPRAY METHOD OF APPLYING A FILM TO A SUBSTRATE

CROSS-REFERENCE TO RELATED APPLICATIONS

This application is a continuation-in-part of U.S. Ser. No. 474,156, filed Mar. 10, 1983, now abandoned.

BACKGROUND OF THE INVENTION

The present invention relates to polyol polymers cured with multi-isocyanate cross-linking agents and more particularly to such a system which is curable in the presence of vaporous tertiary amine catalyst wherein no curing chamber is required.

Vapor permeation curable coatings are a class of coatings formulated from aromatic-hydroxyl functional polymers and multi-isocyanate cross-linking agents wherein an applied film thereof is cured by exposure to a vaporous tertiary amine catalyst. In order to contain and handle the vaporous tertiary amine catalyst economically and safely, curing chambers, eg. U.S. Pat. Nos. 3,851,402 and 3,931,684, were developed. Such curing chambers typically are substantially empty rectangular boxes through which a conveyor bearing the coated substrate passes. Provision is made for entrance and exit of vaporous tertiary amine, normally borne by an inert gas carrier such as nitrogen or carbon dioxide, for example, and means at the inlet and the outlet of the chamber to enhance containment of the vaporous tertiary amine catalyst within the chamber. The inlet and outlet contain means further restrict the entrance of oxygen into the chamber because oxygen can create an explosive condition with the vaporous tertiary amine catalyst. Cure of such coatings is so rapid that no external source of heat is required. An apparent drawback of such curing chambers is the capital investment required and the amount of space which such curing occupy in the plant. For example, such chambers can range up to 40 or 50 feet or longer in order to ensure sufficient contact time between the curable coated substrate and vaporous amine atmosphere. Also, chambers must be specially designed in order to handle large parts, eg. automotive parts, for curing. While such chambers can be engineered, extra expense in their manufacture, operation, and maintenance is required.

One proffered alternative to such vapor permeation curing chambers is the use of dual component spraying systems. For example, commercial spray equipment includes spray guns adapted to spray liquid coating compositions which must be separated from a source of catalyst. Such systems normally employ a mixing head or manifold which immediately precedes the spray tip. Such delayed mixing in the spray process minimizes the opportunity for the catalyst and coating composition to prematurely gel. Excellent discussions of such dual component or catalyst spraying can be found in the *Finishing Handbook,* Chapter 4, p.227 (1973) and Chapter 4, pp 195–230, especially page 223 (1980); *Product Finishing,* Volume 28, No. 6 (June, 1975) and pp 48–55 (March, 1978). The liquid catalyst, optionally dispersed in solvent, is shown to be delivered under pressure of air to the spray gun as is the liquid coating composition.

Another dual spray method involves the simultaneous spraying from two spray nozzles of the liquid coating composition and catalyst component separately as proposed in U.S. Pat. No. 3,960,644. U.S. Pat. No. 3,049,439 provides a design for a spray gun wherein the accelerator or catalyst and resin are premixed within the spray gun in an atomizing chamber immediately prior to exiting from the gun. U.S. Pat. No. 3,535,151 describes the selective addition of water and a thickener to a substantially dry liquid polyester resin in the spray gun as the polyester resin is being sprayed. U.S. Pat. No. 3,893,621 proposes a multi-nozzled spray gun which discharges an airless spray of liquid promoted resin from a first pair of nozzles and low pressure air atomized liquid catalyst from a second pair of nozzles wherein each atomized stream is mixed by intersection of each atomized stream exiting the spray gun immediately prior to deposition onto a substrate. U.S. Pat. No. 4,322,460 proposes to utilize a conventional two-component spray nozzle with mixing of a polyester resin and a benzoyl peroxide catalyst dissolved in cyclohexanone in the mixing head of the spray nozzle. U.S. Pat. No. 3,249,304 proposes to eliminate the possible polymerization of the catalyzed liquid resin within the mixing head of the spray gun during periods when the gun is not being used by providing a solvent wash line which flushes the mixing chamber during periods when the coating composition and catalyst are not fed into the spray gun. U.S. Pat. No. 3,179,341 provides yet another design for the mixing head within the spray gun for multi-component systems which include a resin and catalyst therefor. U.S. Pat. No. 1,841,076 intersects a spray of coagulable rubber and coagulant vapor wherein the coagulable rubber streams are created from two separate spray nozzles. Similarly, U.S. Pat. No. 2,249,205 takes two separate spray guns and intersects a stream of removable latex and atomized fluid coagulant which intermixed streams then are applied to a substrate. U.S. Pat. No. 4,195,148 (and U.S. Pat. No. 4,234,445) utilizes a conventional internally mixed spray gun as described above for spraying a mixture of a polyurethane prepolymer and an isocyanate curative therefor.

As the Examples will demonstrate, the obvious choice of a conventional two-component mixing spray nozzle for use with vapor permeation curable coatings was unsatisfactory because the catalyzed liquid coating composition gelled so rapidly that the spray gun became sufficiently plugged and spraying ceased. Thus, a new method for utilizing spray application for vapor permeation curable coatings was required. The present invention is directed to such a novel spray method.

BROAD STATEMENT OF THE INVENTION

The present invention is a method for applying a film of a liquid coating composition onto a substrate wherein the liquid coating composition comprises a hydroxyl-bearing compound (preferably bearing aromatic hydroxyls) and a multi-isocyanate cross-linking agent, optionally dispersed in fugitive organic solvent therefor. The liquid coating composition cures rapidly at room temperature in the presence of a vaporous tertiary amine catalyst without the necessity for curing heat being applied. The novel method of the present invention comprises concurrently generating an atomizate of said coating composition and a carrier gas bearing a catalytic amount of a vaporous tertiary amine; mixing said atomizate and said vaporous catalytic amine-bearing carrier gas flow; and directing said mixture onto said substrate form of said applied film.

One embodiment of the novel method of the present invention comprises forming an atomizing gas flow comprising an intimate mixture of an atomizing gas bearing a catalytic amount of a vaporous tertiary amine; atomizing said liquid coating composition with said vaporous catalytic amine-bearing atomizing gas flow; and directing the atomizate onto said substrate to form said applied film.

Another embodiment of the novel method of the present invention comprises conducting said process under electrostatic spray conditions. With respect to the generation of the atomizate of the coating composition, an advantageous embodiment comprises mechanically generating said atomizate of said coating composition and thereafter contacting said mechanically-generated atomizate with said vaporous catalytic amine-bearing carrier gas flow.

The carrier gas may be an inert gas or may be air. The temperature and pressure of the carrier gas flow can be adjusted to provide the desired concentration of vaporous tertiary amine catalyst therein and/or additional carrier gas can be added to such stream prior to the spray gun to adjust the concentration of vaporous tertiary amine catalyst.

Advantages of the present invention include the fact that a large, cumbersome, and expensive curing chamber is not required for cure of the vapor permeation curable coatings without sacrifice of performance of the cured coatings. Another advantage is the flexibility provided by the novel vaporous amine catalyst spray method to apply coatings to a variety of parts which are unsuitable or impractical for curing in a chamber. Another advantage is that the speed of cure of the applied film is rapid and substantially equivalent to the speed of cure obtained within a curing chamber. Yet another advantage which will become apparent in the Examples is that the novel vaporous amine catalyst spray method provides the ability to utilize multi-isocyanate curing agents containing only or predominating in aliphatic isocyanate which class of isocyanates have heretofore not been recommended for use in vapor permeation curable coatings. These and other advantages will become readily apparent to those skilled in the art based upon the disclosure contained herein.

DETAILED DESCRIPTION OF THE INVENTION

A unique achievement of the novel vaporous amine catalyst spray method of the present invention is the lack of intensive capital investment required to implement the invention compared to conventional vapor permeation curable technology utilizing a curing chamber. That is, the equipment required for the novel vaporous amine catalyst spray method include an amine generator, a conventional spray gun, optionally a conventional paint spray booth or hood, and optionally conventional amine scrubbing equipment. Except for the spray gun and spray booth, the remaining equipment is often used in practicing conventional vapor permeation curable coatings with a curing chamber. The spray gun and spray booth, however, are conventional and normally found within plants that have conventional coatings lines. The coatings need not be altered in formulation, but for perhaps a viscosity adjustment, for use in the novel vaporous amine catalyst spray method disclosed herein. Thus, the invention easily can be adapted to and implemented in paint spray lines of current commercial design. As will become more readily apparent from the following discussion and Examples, the coated parts can be readily handled within a short period of time following coating, eg. 5-15 minutes, which means that shorter lines can be tolerated in the plant. Moreover, as the Examples will demonstrate, if mild forced-air heating is applied to the coated substrates, solvent removal from the films will be accelerated and handling times decreased.

Referring to the liquid coating compositions which may be used in the vaporous amine catalyst spray method of the present invention, virtually any vapor permeation curable coating formulation can be cured according to the novel method of the present invention. Typical vapor permeation curable coatings formulations comprise an aromatic-hydroxyl functional polymer or resin, a multi-isocyanate curing agent which conventionally contains significant aromatic isocyanate content, and optionally a fugitive organic solvent therefor. For manufacturing a coating composition having an acceptable pot life for use as a one-pack system, a resin predominating in aromatic hydroxyl content is preferred. Where pot life is not a limiting factor and/or where two-pack systems are acceptable, use of a resin containing only aliphatic hydroxyl groups is permissible. Often, though, mixtures of aromatic and aliphatic hydroxyl groups will be found in resins and polymers useful in the coatings art. Since stable one-pack systems are preferred, much of the following description will refer to aromatic hydroxyl-functional resins; though, it will be understood that use of aliphatic hydroxyl-functional resins is permissible. With respect to the aromatic hydroxyl-containing polymer or resin, U.S. Pat. No. 3,409,579 discloses a binder composition of a phenol-aldehyde resin (including resole, novolac, and resitole), which preferably is a benzylic ether or polyether phenol resin, a liquid polyisocyanate, and a tertiary amine curing agent (which may be in vaporous form) dispersed in an organic solvent. U.S. Pat. No. 3,676,392 discloses a resin composition in an organic solvent composed of a polyether phenol or a methylol-terminated phenolic (resole) resin, a liquid polyisocyanate, and a basic curing agent. U.S. Pat. No. 3,429,848 discloses a composition like that in U.S. Pat. No. 3,409,579 with the addition of a silane thereto.

U.S. Pat. No. 3,789,044 is directed to a curable composition composed of a polyepoxide resin capped with hydroxybenzoic acid, a polyisocyanate, and a tertiary amine which may be in gaseous form. U.S. Pat. No. 3,822,226 discloses a curable composition composed of a phenol reacted with an unsaturated material selected from unsaturated fatty acids, oils, fatty acid esters, butadiene homopolymers, butadiene copolymers, alcohols, and acids; a polyisocyanate; and a tertiary amine which may be in gaseous form. U.S. Pat. No. 3,836,491 discloses a curable composition composed of a hydroxy-functional polymer (eg., polyester, acrylic, polyether, etc.) capped with hydroxybenzoic acid, a polyisocyanate, and a tertiary amine which may be in gaseous form. British Pat. No. 1,369,351 is directed to a resinous composition which is curable by exposure to vaporous amine or upon contact with a liquid amine wherein the composition comprises a polyisocyanate and a hydroxy or epoxy compound which has been capped with a diphenolic acid. British Pat. No. 1,351,881 modifies a polyhydroxy, polyepoxy, or polycarboxyl resin with the reaction product of a phenol and an aldehyde which modified resin contains free phenolic hydroxyl groups which then can be reacted with a polyisocyanate in the presence of a liquid or gaseous tertiary amine for obtaining cross-linking and curing of the composition. Much of the material in the foregoing references is discussed in paper entitled "Vapor Permeation Curing", FATI-PEC Congress, 11, 1972, pp 335-342.

U.S. Pat. No. 2,967,117 shows a coating composed of a polyhydroxy polyester and a polyisocyanate which is cured in the presence of a gaseous tertiary amine. U.S. Pat. No. 4,267,239 proposes to react para-hydroxybenzoic acid with an alkyd resin and cure the product with an isocyanate curing agent, optionally with a vaporous tertiary amine catalyst. U.S. Pat. No. 4,298,658 proposes an alkyd resin modified with 2,6-dimethylol-p-cresol which is cured with an isocyanate curing agent, optionally with a vaporous tertiary amine.

More recent and presently preferred aromatic hydroxyl-functional polymers, though, include U.S. Pat. Nos. 4,343,839; 4,365,039; and 4,374,167 which disclose polyester resin coatings especially adapted for flexible substrates and which comprises an aromatic hydroxyl-functional condensation product, a multi-isocyanate curing agent, a volatile organic solvent therefor, and a unique mar-resisting agent of an organic compound physically incompatible in the coating composition and having an effective chain length of at least about 12 carbon atoms. U.S. Pat. No. 4,374,181 discloses coatings especially adapted for reaction injection molded (RIM) urethane parts which is composed of an aromatic hydroxyl functional condensation product comprising a linear aliphatic dibasic acid, a linear aliphatic glycol, and a combination of a linear aliphatic glycol and aromatic dicarboxylic acid, and a phenol-capping agent, wherein molecular weight and equivalent weight are closely controlled. A multi-isocyanate curing agent and volatile organic solvent are included in the coating composition. U.S. Pat. No. 4,331,782 discloses a hydroxybenzoic acid-epoxy adduct for capping polyester resins ideally suited for vapor permeation curable coating compositions. U.S. Pat. No. 4,343,924 proposes a stabilized phenol-functional condensation product of a phenol-aldehyde reaction product bearing a plurality of methylol and phenol groups, and a polyol, polycarboxylic acid, or polyepoxide, wherein the condensation product is reacted with a selective transmethylolating agent for substantially transforming residual methylol groups into non-active hydrogen groups. The stabilized phenol-functional condensation product is combined with a multi-isocyanate cross-linking agent, and an organic solvent therefor for vapor permeation curing. U.S. Pat. No. 4,366,193 discloses the use of an aromatic hydroxyl-functional compound comprising substituted or unsubstituted 1,2-dihydroxybenzene or derivatives thereof for vapor permeation curable coatings. U.S. Pat. No. 4,368,222 discloses the uniqueness of utilizing vapor permeation curable coatings for surface-porous substrates of fibrous-reinforced molding compounds (eg. SMC) for minimizing surface imperfections in the cured coating. U.S. Pat. No. 4,396,647 discloses the use of 2,3',4-trihydroxydiphenyl for vapor permeation curing.

It will be appreciated that additional aromatic-hydroxyl polymers and resins can be utilized in forming vapor permeation curable coating compositions for use in the novel vaporous amine catalyst spray method disclosed herein. So long as the polyol is curable with a multi-isocyanate curing agent in the presence of a vaporous tertiary amine and is sprayable (i.e. sufficiently liquid on its own, by heating, or by dispersing in a solvent), such polyol is suitable for use in the present invention.

Multi-isocyanate cross-linking agents cross link with the aromatic hydroxyl groups of the resulting adduct-capped polymer under the influence of a vaporous tertiary amine to form urethane linkages and to cure the coating. Aromatic isocyanates are preferred in order to obtain reasonable pot life and the desired rapid reaction in the presence of the vaporous tertiary amine catalysts at room temperature. For high performance coatings, initial color as well as the discoloration due to sunlight can be minimized by including at least a moderate level of aliphatic isocyanate content in the curing agent. Of course, polymeric isocyanates are employed in order to reduce toxic vapors of isocyanate monomers. Further, alcohol-modified and other modified isocyanate compositions find utility in the invention. Multi-isocyanates preferably will have from about 2-4 isocyanate groups per molecule for use in the coating composition of the present invention. Suitable multi-isocyanates for use in the present invention include, for example, hexamethylene diisocyanate, 4,4'-toluene diisocyanate (TDI), diphenylmethane diisocyanate (MDI), polymethyl polyphenyl isocyanate (Polymeric MDI and PAPI), m- and p-phenylene diisocyanates, bitolylene diisocyanate, triphenylmethane triisocyanate, tris-(4-isocyanatophenyl)-thiophosphate, cyclohexane diisocyanate (CHDI), bis-(isocyanatomethyl)cyclohexane ($H_6XDI$), dicyclohexylmethane diisocyanate ($H_{12}MDI$), trimethylhexane diisocyanate, dimer acid diisocyanate (DDI), dicyclohexylmethane diisocyanate, and dimethyl derivatives thereof, trimethyl hexamethylene diisocyanate, lysine diisocyanate and its methyl ester, isophorone diisocyanate, methyl cyclohexane diisocyanate, 1,5-naphthalene diisocyanate, triphenyl methane triisocyanate, xylylene diisocyanate and methyl and hydrogenated derivatives thereof, polymethylene polyphenyl isocyanates, chlorophenylene-2,4-diisocyanate, and the like and mixtures thereof. Aromatic and aliphatic polyisocyanate dimers, trimers, oligomers, polymers (including biuret and isocyanurate derivatives), and isocyanate functional prepolymers often are available as preformed packages and such packages are suitable for use in the present invention also.

The ratio of aromatic hydroxyl equivalents from the phenol-functional compound to the isocyanate equivalents of the multi-isocyanate cross-linking agent should preferably be greater than about 1:1 and can range on up to about 1:2. The precise intended application of the coating composition often will dictate this ratio or isocyanate index. At high cross-linking densities or isocyanate equivalents, harder but relatively inflexible films are produced while at lower cross-linking densities or isocyanate equivalents flexibility of the films increases. Optimizing the particular property or combination of properties desired can be determined as those skilled in this art will appreciate.

The solvent or vehicle for the coating composition is a volatile organic solvent mixture which preferably includes ketones and esters for minimizing viscosity of the composition. Some aromatic solvents may be necessary and typically are a part of the volatiles in commercial isocyanate polymers. For the polyol resin, suitable solvents include, for example, methyl ethyl ketone, acetone, methyl isobutyl ketone, ethylene glycol monoethyl ether acetate (sold under the trademark Cellosolve acetate) and the like. Some solvents can be too volatile so that mixtures may be preferred. For the polyisocyante, conventional commercially available solvents therefor include toluene, xylene, Cellosolve acetate (Cellosolve is a registered trademark and Cellosolve acetate is ethylene glycol monoethyl ether acetate), and the like. Such aromatic solvents are quite compatible with the preferred ketone and ester solvents for the polyester resin when the two packages are mixed together in the pot. Sufficient solvent usually is added in order to bring the non-volatile solids content to the coating composition down to about 50–80% by weight for achieving a practical spray application viscosity, depending upon pigmentation. It should be noted that the effective non-volatile solids content of the coating composition can be increased by incorporation of a relatively low or non-volatile (high boiling) ester plasticizer which is retained for the most part in the cured film. Suitable such ester plasticizers include, for example, dibutyl phthlate, di(2-ethylhexyl)phthlate [DOP], and the like. The proportion of ester plasticizer should not exceed about 5–10% by weight, otherwise loss of mar resistance can occur.

It will be appreciated that additional solvent often may be required in order to achieve an appropriate viscosity for spray of the coating composition according to the precepts of the present invention. The precise viscosity required of the coating composition most often will be dictated by the particular manufacturer's brand of spray equipment utilized, though application onto vertically disposed parts, for example, may alter the viscosity requirements of the coating composition in order to prevent the running and dripping of the coating composition. For application of the coating composition onto parts subject to overspray, adjustment of the solvents to achieve a longer open time of the coating composition can be practiced readily.

As to the performance requirements which are met by the coating composition, it should be noted the coating composition, polyol resin and isocyanate crosslinking agent, have a minimum pot life of at least 4 hours in an open pot and generally the pot life exceeds 8 hours and can range up to 18 hours and more. Such long pot lives means that refilling the pot at the plant during shifts generally is not required. Moreover, the pot life of the coating composition in a closed container generally exceeds one month. After storage of the coating composition, the stored composition can be cut to application viscosity with suitable solvent and such composition retains all of the excellent performance characteristics which it initially possessed.

Additional ingredients which suitably can be incorporated into the coating composition of the present invention include tinctorial pigments, plasticizers, flatting agents, flow leveling agents, and a wide variety of conventional paint additives.

It should be added that a coating composition (eg. polyol, multi-isocyanate cross-linker and optional solvent) is suitable for use in the present invention if it can be transported or conveyed through lines to the spray nozzle and thence atomized. Most often, this translates into the coating composition being liquid. For present purposes, a liquid coating composition comprehends a coating composition which is liquid at room temperature, can be made liquid for spraying by heating, or is made liquid by dispersing in solvent for spraying. Any manner by which the coating composition can be liquefied or rendered liquid for spraying or atomization is suitable for use in the present invention providing that the vapor permeation cure chemistry is maintained.

The vaporous amine catalyst will be a tertiary amine including, for example, tertiary amines containing substituents such as alkyl, alkanol, aryl, cycloaliphatic, and mixtures thereof. Additionally, heterocyclic tertiary amines may be suitable for use in the invention also. Representative tertiary amines include, for example, triethyl amine, dimethyl ethyl amine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, isoquinoline, N-ethyl morpholine, triethylene diamine, and the like and mixtures thereof. Additionally, it is conceivable to use amine oxides and quaternary ammonium amines depending upon the practicality of providing such amines in the vaporous phase. A myriad of proprietary tertiary amine catalysts currently are available and should function in the process additionally. It should be noted that the catalytic activity of the tertiary amine catalysts may be enhanced by the addition of complex salts to the coating composition as reported in the bulletin, "The Activation of IPDI by Various Accelerator Systems", Veba-Chemie AG, Gelsenkirchen-Buer, West Germany. Thus, the addition of ferric, manganic, and aluminum salts to the liquid coating composition may be implemented as an embodiment of the present invention.

While the proportion of vaporous amine catalyst may range up to six percent or more, percentages of less than 1% typically will suffice, eg. between about 0.25 and 1%. It should be cautioned that higher levels of amine catalyst are not recommended where air or sources of molecular oxygen are present as explosive mixtures may result. The tertiary amine catalyst is in vaporous form in a carrier gas which may be inert, such as nitrogen or carbon dioxide, or may be in air, or mixtures thereof. It will be appreciated that depending upon the carrier gas and the particular tertiary amine catalyst of choice, that certain minimum temperatures and pressures of the atomizing gas stream must be maintained in order to ensure that the amine catalyst remains vaporous and does not condense in any lines. Maintenance of the tertiary amine catalyst in vapor phase, though, is within the skill of routine engineering.

As to the type of equipment required to generate the vaporous amine and deliver the vaporous amine in carrier gas, a variety of amine vapor generators are commercially manufactured and most often utilized with the cold box process in the foundry industry. Various types of amine generators in common use include the liquid injector type and the vaporizer type. The injector type amine generator forces liquid amine into a stream of fast-moving carrier gas, either compressed air or inert gas such as dry $CO_2$ or $N_2$. The turbulent carrier stream evaporates the volatile amine and transports it to the spray gun. The amine catalyst is forced into the carrier gas line by one of two mechanisms. The first mechanism is a calibrated piston operating against check or diverter valves. The second method is a pressurized amine holding tank which delivers amine for a pre-set length of time. The vaporizer type of amine generator accomplishes the gasification of the amine catalyst either by bubbling carrier gas through a deep bath of liquid amine (bubbler type), or by heating (boiling) the amine prior to blending with the carrier gas (proportioner type). All of the acceptable commercial generator types and variations thereof have the ability to deliver vaporous amine in a short period of time and can be suitably modified to provide a sufficient volume typically utilizing an accumulator for providing surge capacity as required for extended periods of demand on the amine generator system. Of course, all lines will be steam traced or otherwise heated in order to ensure that the vaporous amine catalyst does not condense in any of the lines. Also, the amine generators and accumulators most often will be heated for the same purpose. A representative amine vapor generator used in the foundry core industry is shown in U.S. Pat. No. 4,051,886.

From the amine generator or accumulator, the gas flow bearing catalytic vaporous tertiary amine will be transported, preferably through steam traced or heated piping, to the spray gun. Nominally any conventional or unconventional spray gun for spraying of liquid coating or paint composition can be used according to the precepts of the present invention. Spray guns conventionally fall into two classes: gas atomized and mechanically (eg. non-gas) atomized. Referring initially to gas atomized spray techniques, the atomizing gas flow bearing vaporous tertiary amine will be the atomizing gas which will atomize the liquid coating composition in conventional fashion through the spray gun. Most often the atomizing gas flow will be heated to a temperature sufficient to ensure that the vaporous tertiary amine remains in its vapor phase. It also is possible to preheat the liquid coating composition for ensuring appropriate viscosity for spraying and/or to achieve special effects.

Referring to mechanically-atomized spray techniques, mechanical generation of atomized liquid coating composition may be accomplished by use of a conventional spinning disk, spinning bell, or other form of mechanical atomizer. Spray patterns exiting spray guns which implement mechanical atomization are subject to fines and drift of the coating composition since the impetus of an atomizing flow of gas is lacking. Accordingly, a flow of forming gas typically is used. Such forming gas flow is an envelope of inert gas or air typically under low pressure and low velocity for providing some direction to the flow and for minimizing loss of fines from the main spray pattern. In fact, such forming gas flow may be used in conventional gas-atomized spray guns, if desired. A hybrid spray technique involving the use of forming air is known as air assisted airless spraying. This system atomizes the coating composition by pumping the coating through an orifice. Low pressure forming air assists in maintaining the spray pattern and improves transfer efficiency. Typical air assisted airless spray guns include Graco AA2000 and AA3000 systems (Graco, INc., Minneapolis, Minn.).

Often, mechanically-formed atomization is used in conjunction with electrostatic spray techniques. The process of the present invention works quite efficiently and effectively under electrostatic and non-electrostatic spray conditions. Electrostatic spray conditions may be imposed upon the gas-atomized spray embodiment of the present invention as well as the mechanically-atomized spray embodiment of the present invention. When the atomizate of the coating composition is formed mechanically or through spray pressure, ie. non-gas atomized spray conditions, the vaporous tertiary amine catalyst is contained in the forming air flow used in conjunction with such spray embodiment. Surprisingly, it was discovered that intimate contact and mixing of the forming air and the atomizate of coating composition between the spray nozzle and the substrate being coated occurs so that cure on the substrate proceeds readily. Thus, for purposes of the present invention, "concurrent generation" of the atomizate of coating composition and vaporous tertiary amine-laden gas flow means that the liquid coating composition is intimately contacted and mixed with the vaporous tertiary amine at a time prior to the deposit of the atomizate of coating composition onto the substrate being coated. Such contact and mixing may occur concurrently with generation of the atomizate of liquid coating composition, ie. gas atomization spray techniques, or may occur after the atomizate is formed utilizing a flow of forming gas as described above. So long as the fine mist or atomizate of atomized particles is contacted with the vaporous tertiary amine catalyst, the present invention is maintained.

Because the tertiary amine catalyst is being exhausted from the spray gun, safety and environmental precaution dictates that operation of the vaporous amine catalyst spray gun be conducted in a conventional paint spray booth or paint spray hood. Such paint spray booths are so conventional that no further description of them need be detailed here. It is to be noted that the spray booth exhaust can be vented to the atomosphere or the amine can be sent to a conventional scrubbing system, typically using an acid such as sulfuric acid or phosphoric acid, or otherwise disposed of in conventional fashion.

Because of the unique intimate contact between the vaporous tertiary amine from the atomizing gas flow and the atomized liquid coating composition, thicknesses of the coating composition on substrates can become quite thick and full cure still achieved. This is to be contrasted with conventional vapor permeation cure technology utilizing a vapor cure chamber wherein extremely thin films must be cured in order to ensure complete diffusion of the vaporous amine through the film thickness. Film thicknesses of 10 to 15 mils or more (dry), however, can be successfully applied and cured according to the vaporous amine catalyst spray method of the present invention. The coated part can be permitted to air dry at ambient indoor temperature and rapid curing will take place. Normally, shorter lines at the plant will be required because the coating becomes tack-free in such a short time. Moreover, conventional baking ovens are no longer required. The speed of cure, however, can be accelerated even more by augmenting the solvent being expelled from the applied film. Such solvent expulsion can be augmented or enhanced by post-conditioning most readily accomplished by thermal means. That is, the vaporous amine catalyst spray-applied coating on the substrate can be exposed to low to moderate heat (eg. about 50°–150° C. desirably, for a short time, eg. about 1–5 minutes desirably). Of course, increased heating temperatures usually mean shorter treatment times and vice versa. Such heat conditioning or treatment is practiced under conditions far short of those (eg. time and temperature) necessary for heat curing an isocyanate/polyol coating, especially since no catalyst is added during such thermal conditioning.

Another unexpected benefit achieved because of the unique intimate contact between the vaporous tertiary amine catalyst and the atomizate of liquid coating composition is the apparent highly efficient cross-linking of hydroxyl and isocyanate groups which occurs. It is believed that substantially more cross-linking occurs prior to reaching the gel point than occurs even using the vaporous amine catalyst in a curing chamber. One consequence of the improved efficiency of cross-linking is that the coating composition exhibits a substantially improved elongation property. Another consequence of the improvement in cross-linking efficiency is the possibility of formulating coating compositions having an isocyanate index at closer to unity, though this currently is not experimentally proven.

The following Examples show how the present invention can be practiced but should not be construed as limiting. In this application, all percentages and proportions are by weight and all units are in the metric system, unless otherwise expressly indicated. Also, all citations herein are expressly incorporated herein by reference.

IN THE EXAMPLES

In Examples 1-4, the novel vapor permeation cure spray method employed a DeVilbiss model MBC 510-36EX siphon spray gun (1.778 mm orifice, 10-12 cc/min rated flow rate, gas consumption of 3.07 L/sec at 2.1 kg/cm$^2$ pressure, fan spray pattern, DeVilbiss Company, Toledo, Ohio 43692). The air input of the spray gun was connected to a heated accumulator maintained at a temperature of about 38° C. (100° F.). The accumulator contained nitrogen bearing 2.7% triethylamine (TEA) catalyst vapor held at a total pressure of about 4.2 kg/cm$^2$ (60 psi).

The TEA nitrogen stream was generated by an amine generator composed of a 190 L (50 gal) tank containing 114 L (30 gal.) of liquid TEA (38° C. and 1.4 kg/cm$^2$). the tank was fitted with a 7.62 cm (3 in.) diameter packed (152.5 cm of Koch Sulzer dense packing) column fitted with a spray nozzle and conventional mist eliminator. Liquid TEA was pumped at a rate of about 3.8 L/min. to the spray nozzle which sprayed the liquid TEA down onto the packing. Nitrogen was bubbled through the column to greater than 95% saturation and sent to the accumulator.

Comparative spray tests also were conducted wherein the liquid coating composition was mixed with liquid triethylamine catalyst in the mixing head of a DeVilbiss model MBC 510-AV601-FX siphon spray gun having a MBC 444 FX fluid needle (1.067 mm oriface, 10-30 cc/min rated flow rate, air consumption of 3.07 L/sec at 2.1 kg/cm$^2$ pressure). Air was delivered to the spray gun at 2.1 kg/cm$^2$ (30 psi) and 3% triethylamine catalyst in MEK solvent was delivered at 1.4 kg/cm$^2$ (20 psi). A ball valve permitted precise control over entry of the test catalyst solution into the mixing head of the spray gun. The mixture of liquid coating composition and catalyst solution gelled so rapidly in the mixing head that extreme caution had to be used. Thus, only 2 panels could be sprayed at a time followed by immediate solvent flushing. Also, a blue dye was added to the catalyst solution so that delivery of the catalyst through the ball valve could be confirmed visually. Both spray guns appeared to deliver equal consumption of applied coating composition based on the visual appearance of the spray fan generated by each gun. Also, the solvent amount in both sprayed formulations was approximately the same. All evaluations in Examples 1-4 were conducted on Bonderite 37 steel panels and all spraying was conducted under a laboratory spray booth with exhaust. During all spray testing of the novel spray method, no amine odor was detected by operating personnel outside the spray booth hood.

In Examples 5-13, the novel vapor permeation cure spray method employed either a DeVilbiss model RAB-500 rotary atomizer (U.S. Pat. Nos. 3,708,240, 3,708,241, and 4,060,336) or a DeVilbiss EAL 100 KV automatic electrostatic spray gun. Operational parameters of this equipment will be set forth in the examples.

Vaporous amine in nitrogen carrier gas was generated by the portable amine generator of Moy, U.S. Ser. No. 607,248, filed May 4, 1984. Briefly, nitrogen flows through a first pressure regulator, which controls the amine vessel pressure, to an insulated heated amine vessel. From the vessel is withdrawn product N$_2$/amine which flows through a second pressure regulator which controls the delivery pressure of the flow to the spray guns. Amine concentrations and generator conditions will be set forth in the examples as will the types of substrates coated.

EXAMPLE 1

The liquid coating composition was formulated from 500 parts by weight of the aromatic hydroxyl-terminated polyester of Example 1 of U.S. Pat. No. 4,374,167 (polyol No. 1002) and 350 parts by weight of isocyanate no. 1004 which was an equal equivalents mixture of Mondur HC isocyanate (tetrafunctional reaction product of hexamethylene diisocyanate and toluene diisocyanate, 11.5% NCO content, equivalent weight of 365, 60% solids in Cellosolve acetate/xylene, Mobay Chemical Company, Pittsburgh, Pa.) and Desmodur L-2291A isocyanate (aliphatic polyfunctional isocyanate of the hexamethylene diisocyanate biuret type, Mobay Chemical Company). The resinous mixture was cut with additional MIBK (methyl isobutyl ketone) solvent to achieve a spray viscosity of 20 sec. in a #4 Ford cup (this viscosity was maintained in Examples 1-4). This coating composition has been shown to possess a pot life in excess of 48 hours in an open pot.

Two panels each were coated by the novel vaporous catalyst spray method and the conventional liquid catalyst spray method. The panels were permitted to air dry at ambient indoor room temperature and then evaluated with the following results.

TABLE 1

| Panel No. | Time (min) Set to Touch[1] | Print Free[2] | Film Thickness (mils) | MEK Double Rubs at 1 hr. |
|---|---|---|---|---|
| Vaporous Catalyst Spray | | | | |
| 1 | 2 | 6 | 0.5 | 80 |
| 2 | 2 | 5 | 0.6 | 110 |
| Liquid Catalyst Spray | | | | |
| 3 | 4 | 15 | 0.5 | 22 |
| 4 | 3 | 12 | 0.4 | 13 |

[1]Coating removed by finger placed on coated panel with light to moderate pressure
[2]Finger print emboss on coating by finger placed on panel with light to moderate pressure The above-tabulated results demonstrate that the novel vaporous catalyst spray method produced a coating which cured much more rapidly than did the conventional liquid catalyst spray method. Coatings lines in commercial plants can be shortened because the coated panels can be handled shortly after coating. Moreover, curing heat is not required. After 24 hours, all coatings possessed in excess of 500 MEK double rubs. Thus, the ultimate properties appear comparable.

EXAMPLE 2

In this Example the vaporous catalyst spray coated panels were subjected to post-cure treatment light heating to increase solvent expulsion from the films. The coating composition of claim 1 (isocyanate index of 1.1:1) was sprayed with the following results.

TABLE 2

| Panel No. | Film Thickness (mils) | Post-Heating | MEK Double Rubs at 1 hr. |
|---|---|---|---|
| 1 | 0.5 | None | 68 |
| 2 | 0.5 | 1 min. at 66° C. | 77 |
| 3 | 0.5 | 2 min. at 66° C. | 120 |
| 4 | 0.5 | 5 min. at 66° C. | 442 |

The post-heating conditions are quite insufficient in time and temperature to cure the coatings, yet these results do demonstrate that the degree of cure is improved by such heating. It is believed that greater amounts of solvent in the films is expelled by the post-cure thermal treatment; thus, the improvement in film properties. These results mean that coatings lines can be shortened even more by implementation of the post-cure thermal treatment. After 5 minutes, the film properties approach their ultimate. Note that all panels were handleable after the thermal treatment and the air-dry (no heat) panel was print-free in 5–6 minutes after coating.

EXAMPLE 3

The following liquid coating compositions were formulated (pbw is parts by weight):

| Formulation 1 | | |
|---|---|---|
| Polyol 1415[1] | | 500 pbw |
| Adipic acid | 7 moles | |
| 1,4-Butane diol | 6 moles | |
| Trimethylolpropane | 2 moles | |
| Diphenolic acid | 2 moles | |
| Mondur CB-60 Isocyanate[2] | | 445 pbw |
| MIBK | | 90 pbw |
| Formulation 2 | | |
| Polyol 51400-9A[3] | | 760 pbw |
| Dimethyl terephthalate | 1 mole | |
| 1,4-Butane diol | 8 moles | |
| Azelaic acid | 6 moles | |
| Diphenolic acid | 2 moles | |
| Isocyanate 1004 | | 350 pbw |
| MIBK | | 180 pbw |
| Formulation 3 | | |
| Polyol 51400-12[4] | | 760 pbw |
| 2-Hydroxyethyl methacrylate | 2 moles | |
| Styrene | 2 moles | |
| Butyl acrylate | 4 moles | |
| 2-Ethyl hexyl acrylate | 2 moles | |
| Butyl methacrylate | 4 moles | |
| Dephenolic acid | 2 moles | |
| Isocyanate 1004 | | 350 pbw |
| MIBK | | 200 pbw |
| Formulation 4 | | |
| Polyol 51400-12 | | 760 pbw |
| Isocyanate KL5-2444[5] | | 231 pbw |
| MIBK | | 150 pbw |

[1]Resin 514 in Example 1 of U.S. Pat. No. 4,368,222
[2]Aromatic isocyanate (NCO equivalent of 10.10 to 11.0) compound, Mobay Chemical Company
[3]Resin 120 in Example 1 of U.S. Pat. No. 4,374,181 with dimethyl terephthalate replacing terephthalic acid.
[4]Diphenolic acid reacted in second stage after all other ingredients reacted in first stage reaction.
[5]Isocyanate KL5-2444 is an aliphatic isocyanate of hexamethylene diisocyanate (NCO content 20%, 90% solids in Cellosolve acetate, equivalent weight of 210), Mobay Chemical Company.

Each of the formulations was applied by the novel vaporous catalyst spray method and by the liquid catalyst spray method with the following results.

TABLE 3

| Formulation No. | Film Thickness (mils) | Set to Touch (min) | Print-Free (min) | MEK Double Rubs | |
|---|---|---|---|---|---|
| | | | | 1 Hr. | 24 Hrs. |
| Vaporous Catalyst Spray | | | | | |
| 1 | 0.5 | 9 | 15 | 500+ | 1000 |
| 2 | 0.5 | 10 | 27 | 150 | 500 |
| 3 | 0.4 | 4 | 6 | 10 | 55 |
| 4 | 0.4 | 20 | 70 | 6 | 175 |
| Liquid Catalyst Spray | | | | | |
| 1 | 0.5 | 10 | 15 | 285 | 1000 |
| 2 | 0.4 | 12 | 30 | 12 | 500 |
| 3 | 0.4 | 5 | 12 | 25 | 55 |
| 4 | 0.4 | 25 | 90 | 3 | 40 |

Several important observations can be made based on the above-tabulated data. The coatings generally were set to the touch and print free in shorter times for the novel vaporous catalyst spray method, except for formulation 3 (which results are not consistent with all other tests). MEK rubs also generally were greater one hour after application of the coating by the vaporous catalyst spray method.

The most remarkable results, however, are for formulation 4 which contained only aliphatic isocyanate cross-linking agent. General teachings in vapor permeation curable technology are that aliphatic isocyanates will not cure completely in the presence of vaporous tertiary amine catalysts or will cure so slowly to make their use undesirable. By the novel vaporous catalyst spray method, however, remarkable cure was achieved as evidenced by the 175 MEK rubs 24 hours after application of the coatings. For the first time use of only aliphatic or predominantly aliphatic multi-isocyanate cross-linking agents in vapor permeation cure coatings appears practical. The acute differences between vaprous amine and liquid amine catalysts is clearly evident.

EXAMPLE 4

In order to demonstrate the ability of the novel spray method to provide very thick cured coatings, the polyol polyester of Example 1 (cut in MIBK to 70% solids rather than cut in Cellosolve acetate) and isocyanate 1004 cross-linking agent were cut in MIBK to the required spray viscosity. The first panel was sprayed to a dry film thickness of 8 mils and the second sprayed to a dry film thickness of 15 mils. Both panels were set to touch in 3 minutes and were print free in 5 minutes. (The room was opened to the outdoors for these tests and it was a dry, warm day. The warmer climate may have resulted in faster drying times compared to the thinner films in the other examples).

Each film was adjudged to be non-blocking and handleable in 20–30 minutes. Within 72 hours from application, each film was fully-cured and tightly bound to the substrate. Thus, the intense expected skinning of the applied films did not suppress cure through the thickness of the film nor interfere with solvent expulsion from the film. That such thick films can be fully cured by vapor permeation cure means is yet another unique achievement of the present invention.

EXAMPLE 5

The following liquid coating compositions were formulated:

| Formulation 112-2G | (pbw) | grams |
|---|---|---|
| Polyol base 112-2 | | |
| Polyol 51400-5[1] | 375.0 | 637.0 |
| Polyol 1002[2] | 125.0 | |
| Cellosolve acetate | 180.0 | |
| MPA-60X additive[3] | 16.0 | |
| Anti-Terra U Additive[4] | 1.0 | |
| Raven Black 1255 pigment[5] | 27.0 | |
| Baramite XF pigment[6] | 644.0 | |
| MIBK | 34.0 | |
| Mondur CB-60 Isocyanate[7] | | 154.0 |
| Cellosolve acetate | | 90.0 |

[1] Polymer of isophthalic acid (6.67 wt %); 1,4-butanediol (28.97 wt %); azelaic acid (41.35 wt %); diphenolic acid (23.01 wt %)
[2] See Example 1
[3] MPA 60X thixotropic rheological additive, 40% non-volatile solids (in xylene), density of 0.872 g/cm, bulking value 0.138 U.S. gal/lb, NL Chemicals/NL Industries, Inc., Hightstown, New Jersey 08520
[4] Anti-Terra U is a proprietary pigment wetting agent of unknown composition for preventing pigment settling, Byk Mallinkrodt, Inc.
[5] Raven Black 1255 is a carbon black supplied by Columbian Chemical Company, a subsidiary of Cities Chemical Company, Tulsa, Oaklhoma.
[6] Baramite XF barytes, mean particle size 2.5 microns, Thompson, Weinman and Company, Cartersville, Georigia 30120.
[7] See Example 3.

| Formulation 150-1 | Lbs. | Gal. |
|---|---|---|
| Part A | | |
| Polyol 1002 | 57.0 | 6.32 |
| Chrome Yellow X-3356[1] | 177.0 | 2.52 |
| Phthalo Blue BT-479-D[2] | 7.0 | .62 |
| Titanium dioxide RCL-6[3] | 8.0 | .25 |
| Cellosolve acetate | 55.0 | 6.79 |
| FC-430 surfactant[4] | 2.0 | .28 |
| Grind (Pebble Mill to 7 + Hegman) | | |
| Polyol 1002 | 257.0 | 27.93 |
| Polyol 4301-51[5] | 38.0 | 4.26 |
| Part B | | |
| Isocyanate 41400-E—O[6] | 117.0 | 12.16 |
| Isocyanate 51400-D-O[7] | 117.0 | 12.21 |
| Glycol ether PM acetate[8] | 42.0 | 5.23 |
| Cellosolve acetate | 69.0 | 8.52 |
| Dicyclopentenyl oxyethyl methacrylate[9] | 48.0 | 5.42 |
| Methyl ethyl ketone | 28.0 | 4.17 |
| Cyclohexanone | 28.0 | 3.55 |

[1] Chrome Yellow X-3356 medium yellow pigment, Color Index No. 77600, color index name Y-34, Ciba-Geigy.
[2] Phthalo Blue BT-479-D copper phthalocyanine pigment, Color Index No. 74160, Color Index pigment no. Blue 15:2, E. I. DuPont de Nemours and Co.
[3] RCL-6-titanium dioxide pigment, SCM Corporation, Baltimore, Md.
[4] FC-430 surfactant is a non-ionic fluorocarbon surfactant, Minnesota Mining and Manufacturing Co., St. Paul, Minn., used at 25% in MEK.
[5] Polymer of isophthalic acid (10.65 wt %), adipic acid (18.74 wt %), Cardura E (glycidyl ester of Versatic 911 acid which is a mixture of aliphatic, mostly tertiary, acids with 9-11 carbon atoms, Shell Chemical Co., 14.62 wt %), neopentyl glycol (13.36 wt %), diphenolic acid (18.36 wt %), propylene glycol (5.37 wt %), and caster oil fatty acids (18.91 wt %).
[6] Mixture of Mondur HC isocyanate of Example 1 (63.5 wt %) and Desmodur N-3390 isocyanate (same as Isocyanate KL5-2444 of Example 3 except solvent is butyl acetate, 36.5 wt %).
[7] Mixture of Mondur HC isocyanate (83.9 wt %) and Desmodur N-3390 isocyanate (16.1 wt %).
[8] Glycol ether propyl methyl acetate.
[9] QM-657 brand dicyclopentenyl oxyethyl methacrylate, Rohm and Haas Company, Philadelphia, Pa.

Bonderite 1000 panels were coated using the RAB-500 electrostatic spray gun with the tertiary amine/N₂ gas stream being used as the forming gas. The following conditions were established for these tests.

| Condition | Test 1 | Test 31 | Test 3 |
|---|---|---|---|
| Formulation No. | 112-2G | 112-2G | 150-1 |
| Formulation Visc. (sec.)[1] | 31 sec.[2] | 16 sec. | 31 sec. |
| Catalyst type[3] | TEA | TEA | TEA |
| Catalyst amt. (vol. %) | 0.84% | 0.50% | 0.45% |
| Shaping Gas Pressure (psi) | 30 | 15 | 20 |
| Bell Speed (rpm) | — | 35,000 | 27,000 |

[1] Viscosity in #4 Ford cup in Example 5.
[2] Cut in Cellosolve acetate
[3] Triethylamine (TEA)

Test 1 was an initial test to establish cure response under electrostatic spray conditions where the tertiary amine catalyst was present in the shaping gas which eliminates fines and provides some momentum to the rotary-atomized liquid coating composition. Panels in air after electrostatic spray application were tack free in 3-4 minutes. Panels subjected to post-cure heating for solvent removal from the film passes 100+ MEK rubs upon cooling 5 minutes heating at 180° F. Orange peel was evident which indicated that better flow was needed. The formulation in Test 31 possessed good flow and had 100+ MEK rubs after post-cure heating for 5 minutes at 180° F. Good flow and coverage were noted, though oven problems protracted cure response results in Test 3.

EXAMPLE 6

Formulation 112-2G (viscosity 22 sec., #4 Ford cup) was electrostatically sprayed onto Bonderite 1000 panels using the RAB-500 electrostatic spray gun (27,000 rpm bell speed). Dimethylethanolamine (DMEOLA) catalyst in nitrogen (0.5 vol-%) was used in the gun shaping gas (15 psi). Post-cure heating for five minutes at 180° F. produced a coating that had 100+ MEK rubs after 20 minutes. Again, the vaporous catalyst spray process is demonstrated.

EXAMPLE 7

Formulation 150-1 (viscosity 32 sec. #4 Ford cup) was applied to Bonderite 1000 panels, SMC panels (sheet molding compound panels primed with conductive vapor permeation cured primer and sanded), and RIM panels (reaction injection molded panels primed with conductive vapor permeation cured primer and sanded). The RAB-500 electrostatic spray gun (27,000 rpm bell speed) was used with 0.7 vol.-% DMEOLA in N₂ (15 psi shaping gas).

All coated panels sat in air for 5 minutes after coating followed by 5 minutes at 180° F. post-cure heating. All coatings exhibited very good initial mar resistance. The intercoat compatibility on the SMC and RIM panels were judged to be very good also. Note that other runs on Bonderite 1000 panels at 1.1 vol.-% and 0.9 vol.-% DMEOLA catalyst evidenced panel contamination presumably due to condensation of the catalyst. At 0.7 vol.-%, no contamination was apparent.

EXAMPLE 8

The following conductive primer was formulated.

| Formulation 52-2 | (pbw) | gms |
|---|---|---|
| Polyol base 52 | | 275.1 |
| Polyol 51400-9[1] | 565.0 | |
| Polyol 4301-16[2] | 83.9 | |
| MIBK | 250.0 | |
| Cellosolve acetate | 60.0 | |
| Vinylite AYAA[3] | 96.8 | |
| Anti-Terra U[4] | 0.8 | |
| MPA-60X[4] | 29.0 | |
| Raven Black 1255[4] | 73.0 | |
| Lonza KS-15[5] | 162.1 | |

| -continued | | |
|---|---|---|
| Formulation 52-2 | (pbw) | gms |
| Barytes #1 | 928.3 | |
| Isocyanate 51400-D-O[4] | | 35.9 |
| MIBK/Cellosolve acetate (2:1) | | 45.0 |

[1] See Example 3.
[2] Polymer of trimethylpropane (7.07 wt %), isophthalic acid (8.75 wt %), adipic acid (15.40 wt %), neopentyl glycol (11.52 wt %), Cardura E (see Example 5, 13.17 wt %), and diphenolic acid (37.64 wt %).
[3] Vinylite AYAA polyvinyl acetate resin, specific gravity 1.18, softening point, 97° C., 83,000 MW, 1,500 psi tensile strength, 1.4665 refractive index ($n_D 20°$ C.), Union Carbide Corporation, Danbury, Conn.
[4] See Example 5.
[5] Lonza KS-15 graphite, 0.8 average particle size, Lonza Inc., Fair Lawn, New Jersey.

The conductive primer (22–25 sec., #4 Ford cup) was applied to Bonderite 1000 panels with the RAB-500 electrostatic gun (30,000 rpm bell speed) with 15 psi shaping gas comprising 0.7 vol.-% DMEOLA in $N_2$. Post-cure heating of five minutes at 180° F. produced a coating that passed 100+ MEK rubs 10–15 minutes after application.

EXAMPLE 9

Formulation 150-1 (viscosity 26 sec., #4 Ford cup) was applied to Bonderite 1000 and RIM panels (prepared as in Example 7) with the EAL 100 KV electrostatic spray gun using TEA or DMEOLA in $N_2$ as the gas for atomizing the formulations in the gun. The following conditions were established.

| Condition | Test 28 | Test 25 | Test 26 |
|---|---|---|---|
| Catalyst Type | TEA | DMEOLA | DMEOLA |
| Catalyst Amount (vol %) | 0.7 | 0.7 | 0.7 |
| Atomizing Gas Pressure (psi) | 60 | 60 | 60 |
| Substrate | Bonderite | Bonderite | RIM |

All panels were post-cure heated for five minutes at 180° F. subsequent to the panels remaining at room temperature in air for five minutes. All panels passed 100+ MEK rubs after 10–15 minutes and the panels in Tests 25 and 26 had very good initial mar resistance.

EXAMPLE 10

Formulation 112-2G was applied to Bonderite 1000 panels with the EAL 100 KV electrostatic spray gun as follows:

| Condition | Test 18 | Test 23 |
|---|---|---|
| Formulation Viscosity (sec.) | 22–24 | 16–18 |
| Catalyst Type | DMEOLA | DMEOLA |
| Catalyst Amount (vol. %) | 0.5 | 0.45 |
| Atomizing gas pressure (psi) | 30 | 58 |

Post-cure heating of the panel for five minutes at 180° F. was practiced. The panels of Test 18 were double-sprayed and passed 100+ MEK rubs after post-cure heating. Flow, however, was better in Test 23 which used a higher atomization gas pressure.

EXAMPLE 11

Formulation 52-2 conductive primer (viscosity 16–18 sec., #4 Ford cup) was applied to Bonderite 1000 panels with the EAL 100 KV electrostatic spray gun. DMEOLA catalyst (0.45 vol.-%) in $N_2$ at 58 psi was used to atomize the primer. Post-cure heating of panels was for five minutes at 180° F. The primer showed very good flow and cure response. The cured primer passed 100+ MEK rubs 10–15 minutes after application.

EXAMPLE 12

A comparative test was conducted using the RAB-500 electrostatic spray gun and formulation 112-2 G (viscosity 16 seconds, #4 Ford cup). Liquid TEA catalyst (0.5 vol.-%) was added to Part A and introduced into the gun through one port while Part B was introduced into the gun through the other paint inlet port. Shaping air at 15 psi contained no catalyst. The bell speed was 35,000 rpm.

The coating exhibited good flow characteristics but a poor cure response. Also, coating inhomogeneity was apparent on the panel.

EXAMPLE 13

The following black primer was formulated:

| | Weight (kg) |
|---|---|
| Polyol Base | |
| Polyol 51400-5[1] | 315.00 |
| Glycol ether ethyl ethyl acetate | 191.48 |
| Methyl isobutyl ketone | 236.12 |
| Anti-Terra U Additive[1] | .45 |
| Raven Black 1255 pigment[1] | 33.75 |
| Barytes #1 | 186.75 |
| LoVel 39A silica[2] | 56.70 |
| Multi-isocyanate | |
| Isocyanate 51400-H—O[3] | 113.40 |

[1] See Example 5.
[2] PPG Industries, Inc., Pittsburgh, Pa.
[3] Mixture of 75% Isocyanate KL 5-2444 (Example 3) and 25% Mondur HC isocyanate (Example 1) on an equivalents basis.

The primer was applied to RIM panels by two spray techniques. The comparative technique involved conventional spray application followed by exposure to vaporous DMEOLA in a conventional vaporous amine chamber. The novel spray technique as employed to coat other RIM panels using vaporous DMEOLA to atomize the primer. The coated panels then were tested on an Instron instrument to determine elongation performance of the coating on the panels. The conventionally chamber cured panels consistently yielded elongations of 90–100% (at failure of the coating on the substrate). The novel spray cured panels, however, reproducibly yielded elongations of 160–170%. It is believed that the superior elongation performance of the novel spray cure process results from the higher degree of crosslinking (higher cross-link density) and hydroxyl conversion in the process.

Additional panels were subjected to QUV weathering studies with the following results being recorded.

| | WEATHERING | |
|---|---|---|
| Catalyst Spray Method | | Conventional Chamber Catalyst Cure |
| Initial | | |
| No bronzing | | No bronzing |
| No chalking | | No chalking |
| 60° Gloss - 11.9 | | 60° Gloss - 14.1 |
| 1000 hours | | |
| Slight bronzing | | Moderate bronzing |
| No chalking | | Slight chalking |
| 60° Gloss - 7.0 | | 60° Gloss - 3.0 |

These results again demonstrate the improvement experienced by the novel vaporous catalyst spray method of the present invention. The novel spray coated panels exhibited dramatically improved performance in the weathering studies compared to conventionally chamber cured coatings.

EXAMPLE 14

A conventional heat-cured, automotive two-pack urethane system (Polane manufactured by PPG Industries, Pittsburgh, Pa.) was subjected to the novel vaporous catalyst spray process. Component "A" (Polane E61BB7) is believed to be an aliphatic hydroxyl alkyl modified polyester and component "B" (V66V27) is an aromatic polyisocyanate curing agent. The coating composition was applied to an SMC panel using vaporous DMEOLA to atomize the coating in the manner of Example 1. The coating also was conventionally air sprayed onto another SMC panel. Both panels were post-cure heated at 180° F.

The novel spray process coated panel was dry and handleable after 3 minutes whereas the comparative panel still was wet. The novel spray process coated panel passed 50–100 MEK rubs while the comparative panel possessed no MEK rub resistance. These results demonstrate that the novel vaporous catalyst spray process possesses efficacy for aliphatic hydroxyl resins as well as aromatic hydroxyl resins.

I claim:

1. A method for applying onto a substrate a film of a coating composition in liquid form and which comprises a hydroxy-functional compound and a multiisocyanate cross-linking agent, wherein said applied film is curable rapidly at room temperature, which comprises:
   (a) concurrently generating an atomizate of said coating composition and a carrier gas bearing a catalytic amount of a vaporous tertiary amine;
   (b) mixing said atomizate and said vaporous catalytic amine-bearing carrier gas flow; and
   (c) directing said mixture of step (b) onto said substrate to form said applied 10 film.

2. The method of claim 1 wherein said coating composition additionally comprises a volatile organic solvent.

3. The method of claim 1 wherein said hydroxyl-functional compound is resinous or polymeric.

4. The method of claim 1 wherein said carrier gas is air.

5. The method of claim 1 wherein said carrier gas is an inert gas.

6. The method of claim 5 wherein said inert carrier gas comprises nitrogen or carbon dioxide.

7. The method of claim 1 wherein said carrier gas is a mixture of air and an inert gas.

8. The method of claim 1 wherein said atomizing gas flow is at a sufficient temperature and pressure to prevent said catalytic amine from condensing from its vaporous state.

9. The method of claim 1 wherein said coated substrate is subjected to a thermal conditioning step comprising maintaining said cured film at a temperature of between about 50° and 150° C. for a time ranging from between about 1 and 5 minutes.

10. The method of claim 1 wherein said atomizate of step (b) is directed onto said substrate to form a cured film ranging up to about 15 mils in thickness.

11. The method of claim 1 wherein said multi-isocyanate cross-linking agent is polymeric.

12. The method of claim 1 wherein said multi-isocyanate cross-linking agent is an aromatic multi-isocyanate, an aliphatic multi-isocyanate, or mixtures thereof.

13. The method of claim 11 wherein said multi-isocyanate cross-linking agent is an aromatic multi-isocyanate, an aliphatic multi-isocyanate, or mixtures thereof.

14. The method of claim 1 wherein the ratio of hydroxyl equivalents of said hydroxyl-functional compound to the isocyanate equivalents of said multiisocyanate cross-linking agent range from between about 1:1 and 1:2.

15. The method of claim 1 wherein said vaporous tertiary amine catalyst is selected from the group consisting of triethyl amine, dimethyl ethyl amine, trimethyl amine, tributyl amine, dimethyl benzyl amine, dimethyl cyclohexyl amine, dimethyl ethanol amine, diethyl ethanol amine, triethanol amine, pyridine, 4-phenylpropyl pyridine, 2,4,6-collidine, quinoline, isoquinoline, N-ethyl morpholine, triethylene diamine, and the like and mixtures thereof.

16. The method of claim 1 wherein said atomizate is generated by atomizing said liquid coating composition with said vaporous catalytic-amine-bearing atomizing carrier gas flow.

17. The method of claim 1 wherein said concurrent generation is conducted under electrostatic spray conditions.

18. The method of claim 1 wherein said atomizate is generated mechanically and thereafter contacted with said vaporous catalytic amine-bearing carrier gas flow.

19. The method of claim 1 wherein said hydroxy-functional compound is an aromatic hydroxyl-functional compound.

20. A method for applying onto a substrate a film of a coating composition in liquid form and which comprises an aromatic hydroxyl-functional compound and a multi-isocyanate cross-linking agent, wherein said applied film is curable rapidly at room temperature, which comprises:
   (a) forming an atomizing gas flow which comprises an intimate mixture of a carrier gas bearing a catalytic amount of a vaporous tertiary amine;
   (b) atomizing said liquid coating composition with said vaporous catalytic amine-bearing atomizing carrier gas flow; and
   (c) directing said atomizate of step (b) onto said substrate to form said applied film.

21. The method of claim 20 wherein said coating composition additionally comprises a volatile organic solvent.

22. The method of claim 20 wherein said aromatic hydroxyl-functional compound is resinous or polymeric.

23. The method of claim 20 wherein said multi-isocyanate cross-linking agent is polymeric.

24. The method of claim 20 wherein said multi-isocyanate cross-linking agent is an aromatic multi-isocyanate, an aliphatic multi-isocyanate, or mixtures thereof.

25. The method of claim 23 wherein said multi-isocyanate cross-linking agent is an aromatic multi-isocyanate, an aliphatic multi-isocyanate, or mixtures thereof.

26. The method of claim 20 wherein said atomizing is conducted under electrostatic spray conditions.

27. A method for applying onto a substrate a film of a coating composition in liquid form and which comprises an aromatic hydroxyl-functional compound and a multi-isocyanate cross-linking agent, wherein said applied film is curable rapidly at room temperature, which comprises:

(a) concurrently generating an atomizate of said coating composition under airless or mechanical conditions, and a carrier gas bearing a catalytic amount of a vaporous tertiary amine;

(b) mixing said atomizate and said vaporous ctalytic amine-bearing carrier gas flow; and (c) directing said mixture of step (b) onto said substrate to form said applied film.

28. The method of claim 27 wherein said atomizate is generated mechanically and thereafter contacted with said vaporous catalytic amine-bearing carrier gas flow.

29. The method of claim 27 wherein said atomizate is generated under airless spray conditions and thereafter contacted with said vaporous catalytic amine-bearing carrier gas flow.

30. The method of claim 27 wherein said coating composition additionally comprises a volatile organic solvent.

31. The method of claim 27 wherein said aromatic hydroxyl-functional compound is resinous or polymeric.

32. The method of claim 27 wherein said multi-isocyanate cross-linking agent is polymeric.

33. The method of claim 27 wherein said multi-isocyanate cross-linking agent is an aromatic multi-isocyanate, an aliphatic multi-isocyanate, or mixtures thereof.

34. The method of claim 32 wherein said multi-isocyanate cross-linking agent is an aromatic multi-isocyanate, an aliphatic multi-isocyanate, or mixtures thereof.

35. the method of claim 27 wherein said concurrent generation is conducted under electrostatic spray conditions.

* * * * *